May 20, 1924.

W. E. MORGAN

ABSORPTION BOTTLE

Filed March 31, 1923

1,494,367

INVENTOR
W. E. Morgan
BY Sigmund Herzog
ATTORNEY

Patented May 20, 1924.

1,494,367

UNITED STATES PATENT OFFICE.

WILLIAM EDGAR MORGAN, OF MORSEMERE, NEW JERSEY, ASSIGNOR TO THE EMIL GREINER COMPANY, OF NEW YORK, N. Y., A CORPORATION OF NEW YORK.

ABSORPTION BOTTLE.

Application filed March 31, 1923. Serial No. 629,078.

*To all whom it may concern:*

Be it known that I, WILLIAM E. MORGAN, a citizen of the United States, and resident of Morsemere, in the county of Bergen and State of New Jersey, have invented certain new and useful Improvements in Absorption Bottles, of which the following is a specification.

The present invention relates to absorption bottles for use in the quantitative analysis of organic and other substances. More particularly, the invention pertains to an absorption bottle for moisture and carbon dioxide determinations.

One of the objects of the invention is to provide a single piece of apparatus in which the determining of the carbon dioxide contents and the absorption of the moisture from the residual gases may be conducted in a more simple, accurate and efficient manner than has heretofore been possible.

Another object of the invention is to so design the absorption bottle as to retain the advantage of employing a solid absorbing agent, such as soda-lime, without undue complication of the structure, and consequent high selling prices, or excessive weight of the container, and consequent inconvenience and inaccuracy in weighing.

A further object of the invention is to so construct the bottle that every part of it may be subjected to vigorous mechanical action when the exhausted charge is to be removed and the apparatus is generally to be cleaned.

A still further object of the invention is to so construct the absorption bottle that it may be conveniently filled, emptied, wiped, to remove foreign substances from its exterior surface, and easily manipulated.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

One of the many possible embodiments of the invention is illustrated in the accompanying drawings, in which:—

Figure 1:
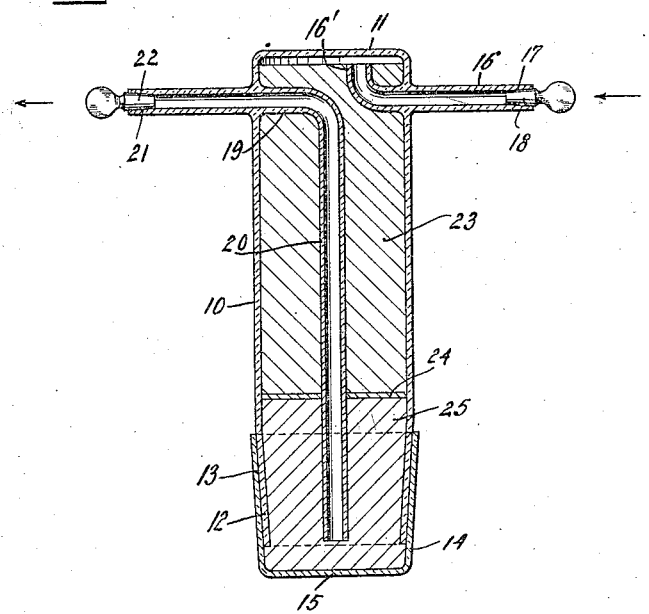
Figure 2:
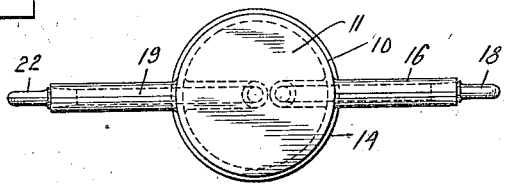

Figure 1 is a central vertical section taken through an absorption bottle constructed in accordance with the present invention; and Fig. 2 is a top plan view thereof.

In the drawings, the numeral 10 indicates a container, that is, preferably, of cylindrical configuration, it being made of glass usually employed in the construction of devices of this type. This container is provided with a flat top 11, its lower end or base, which is open, being tapered, as clearly shown at 12. The outer surface of the tapered portion is ground, for co-operation with the inner ground surface 13 of a closing cap 14. This cap is provided with a flat base 15, upon which the device may stand upright.

A suitable distance below the top 11, there extends through the container 10 an inlet tube 16, preferably, fused to the said container. The inner end 16′ of this tube is bent upwards toward the top 11, while its outer end is provided with a ground seat 17, to receive a stopper 18. A suitable distance below the top 11 there also extends through the container a second tube, denoted by the numeral 19, also, preferably, fused to the container. This tube is provided with a vertical leg 20 within the container, the said leg extending downwards toward the open bottom of the said container, preferably, centrally and terminating adjacent the said open bottom. The outer end of the tube 19 is provided with a ground seat 21, to receive a stopper 22.

Those sections of the tubes 16 and 19 which are disposed outside of the container 10 extend, preferably, horizontally and are adapted to be connected, after the stoppers have been removed, with other members of the apparatus.

In order to charge the bottle for carbon dioxide absorption, it is set, bottom up, on its flat top 11, the requisite amount of an absorption agent, such as soda-lime, denoted by the numeral 23, introduced, a cotton or rubber diaphragm 24 placed on top of the soda lime, if desired, and a drying agent, such as calcium chloride, denoted by the numeral 25, added. The ground joint 12 at the base of the container 10 is then greased and the cap 14 is put into place. When the bottle is then inverted, it is ready for use, the stoppers 18 and 22 being removed and the pipes 16 and 19 connected with other parts of the apparatus. The gas current is led into the apparatus through the pipe 16, it passing through the charges of soda-lime and calcium chloride into the vertical leg 20 of the tube 19, leaving the apparatus through the latter. The moist soda-lime absorbs the carbon dioxide and the moisture from the residual gas is retained within the bottle by the drying agent, that is to say the calcium chloride. The absorption bottle is then disconnected from the other parts of the apparatus, after which the amount of carbon dioxide may be determined by a single weighing operation, the weight of the bottle and the charges therein having been ascertained before the gas current had been passed therethrough.

It is to be noted that several determinations can always be made with a single charge, and checks may be obtained even when the charge materials have remained in contact for several days. Actual experiments have shown that it is unnecessary to introduce ground glass valves, with their attendant weight, difficulty of fitting, and liability of sticking, for the purpose of separating the soda-lime and calcium chloride between runs. Special experimental work with a perforated rubber septum has also shown that the migration of water from the soda-lime to the calcium chloride may be ignored.

It is to be noted that every part of the improved apparatus is conveniently accessible for the removal of the exhausted charges. The position of the calcium chloride below the soda-lime, rather than inside a tube surrounded by soda-lime, tends to minimize temperature fluctuations in the absorption efficiency of the calcium chloride corresponding to the temperature changes of the reacting soda-lime.

Attention is called to the fact that with ordinary care the bottle is more durable than other heavier vessels heretofore in use, since the small diameter of the bottle permits of a firm grasp of the sidewardly projecting sections of the tubes 16 and 19, while attaching the connections to the latter, thus obviating breakage of the said tubes, an otherwise frequent accident.

It is also to be noted that the full bottle may be handled by the upper half without danger of the cap base falling off, provided the ground glass joint has been properly greased.

Attention is also called to the fact that the absence of external attachments facilitates wiping to constant weight. All joints are conveniently accessible to the loosening action of warm water, if stuck.

What I claim is:—

1. An absorption bottle comprising a container closed at its top and open at its base, a closure cap having a flat bottom fitting over said base, an inlet tube extending through said container adjacent its top, and an outlet tube also extending through said container adjacent its top and having a downwardly projecting portion extending substantially to the base of said container.

2. An absorption bottle according to claim 1, said inlet tube having its end within said container bent upwards toward the top of said container.

3. An absorption bottle according to claim 1, said container having an exteriorly ground portion adjacent its base and said cap having an interiorly ground portion for co-operation with the ground portion of said container.

4. An absorption bottle according to claim 1, both of said tubes being fused to said container to provide an air-tight closure.

5. An absorption bottle according to claim 1, those portions of said inlet and outlet tubes which are disposed outside of said container projecting sidewardly.

6. An absorption bottle according to claim 1, the outer ends of said inlet and outlet tubes being provided with ground seats, and a stopper fitting each of said seats.

7. An absorption bottle according to claim 1, the top of said container being flat.

Signed at New York, in the county of New York and State of New York, this 21st day of March, A. D. 1923.

WILLIAM EDGAR MORGAN.